B. T. Harris,
Screw Driver,
Nº 60,367.
Patented Dec. 11, 1866.
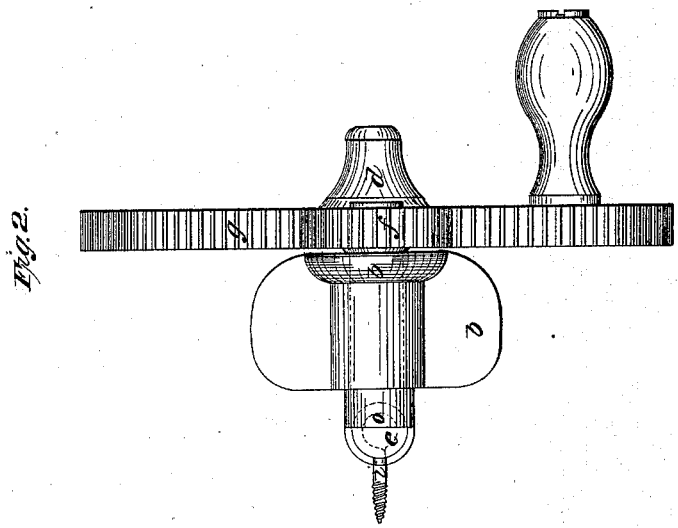
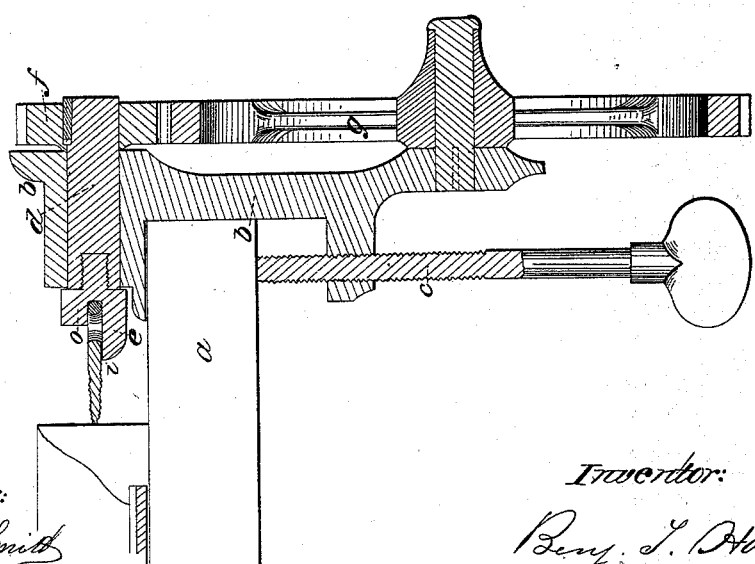
Witnesses:
Chas. H. Smith
Geo. F. Pinckney.
Inventor:
Benj. T. Harris.

United States Patent Office.

IMPROVEMENT IN TOOLS FOR INSERTING SCREW EYES.

BENJAMIN T. HARRIS, OF BROOKLYN, NEW YORK.

Letters Patent No. 60,367, dated December 11, 1866.

*The Schedule referred to in these Letters Patent and making part of the same.*

TO ALL WHOM IT MAY CONCERN:

Be it known that I, BENJAMIN T. HARRIS, of Brooklyn, in the county of Kings, and State of New York, have invented, made, and applied to use a certain new and useful Improvement in Machines for Inserting Screw Eyes; and I do hereby declare the following to be a full, clear, and exact description of the said invention, reference being had to the annexed drawing, making part of this specification, wherein—

Figure 1 is a vertical section of my said machine; and

Figure 2 is a plan of the same, with the screw eye shown in red lines, in the position it occupies in the machine.

Similar marks of reference denote the same parts.

Screw eyes are inserted into the backs and edges of picture frames, show cards, &c., for suspending them. Where there are a large number of these frames much time is consumed in measuring the position of the eyes and inserting the same, either by screwing in the eye with the fingers or first boring the hole. The operation is very tedious and tiring to the fingers, and frequently, through inattention, the eye is not inserted into the right place, and the picture will not hang straight.

The nature of my said invention consists in an eye-holder revolved by mechanism, so that the frame can be presented and guided by a gauge while the screw eye is rotated by the holder and screwed in. By this means I am enabled to insert the screw eyes with great rapidity and accuracy, and the personal inconvenience in so doing is avoided.

In the drawing, $a$ is the table or bed upon which is laid the frame, and upon which bed is to be placed an adjustable gauge to determine the position of the frame relatively to the machine. $b$ is the metal frame of the machine, attached to the bed $a$ by the screw $c$, and the frame $b$ carries at its upper end the shaft $d$ of the eye-holder $e$. $f$ is a pinion at one end of $d$, driven by a wheel, $g$, and crank or handle, $h$. The eye-holder $e$ is made as a flattened recess at the end of the shaft $d$, of a size and shape to receive the eye portion with the screw shank thereof on the line of the axis of $d$, a notch, at $i$, being provided for the shank of the screw eye, and an overhanging lip at $o$, to grasp the eye and rotate the same to screw the shank into the frame as the handle $h$ is turned. The eye-holder $e$ may be screwed upon the end of $d$, so as to be changed to suit different sizes of eyes. The machine may be raised or lowered, so as to bring the screw eye at the proper height from the table or rest for the frame.

What I claim, and desire to secure by Letters Patent, is—

The device for inserting screw eyes in picture frames, &c., consisting of the eye-holder $e$, formed substantially as specified, and rotated by the mechanism herein described, substantially as set forth.

In witness whereof I have hereunto set my signature, this 25th day of October, A. D 1866.

BENJ. T. HARRIS.

Witnesses:
 CHAS. H. SMITH,
 GEO. T. PINCKNEY.